(No Model.)
A. H. ARMEN.
VOLTMETER.
No. 496,678. Patented May 2, 1893.
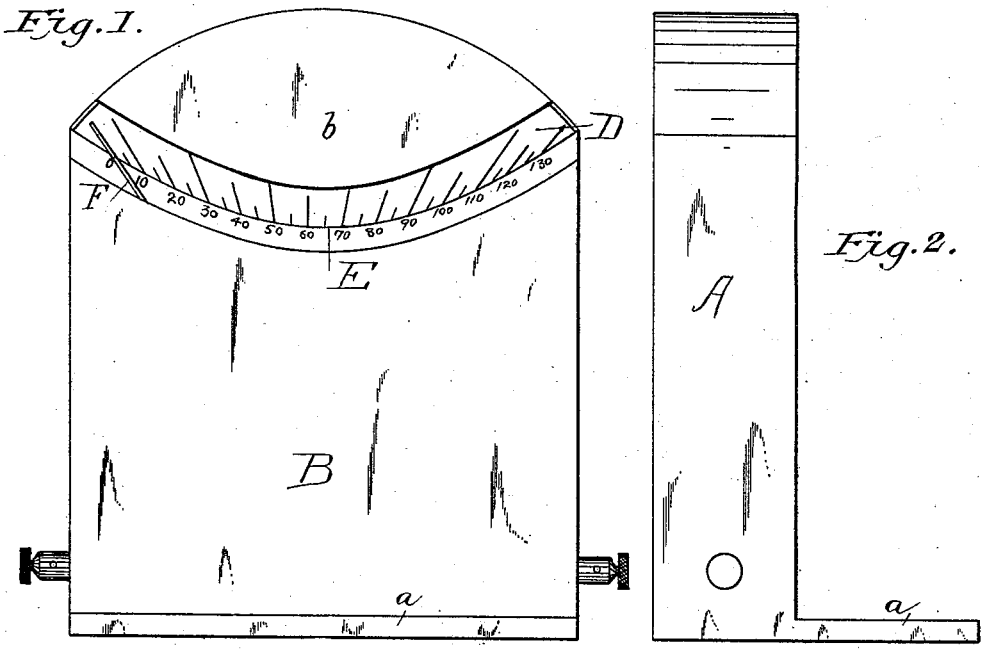
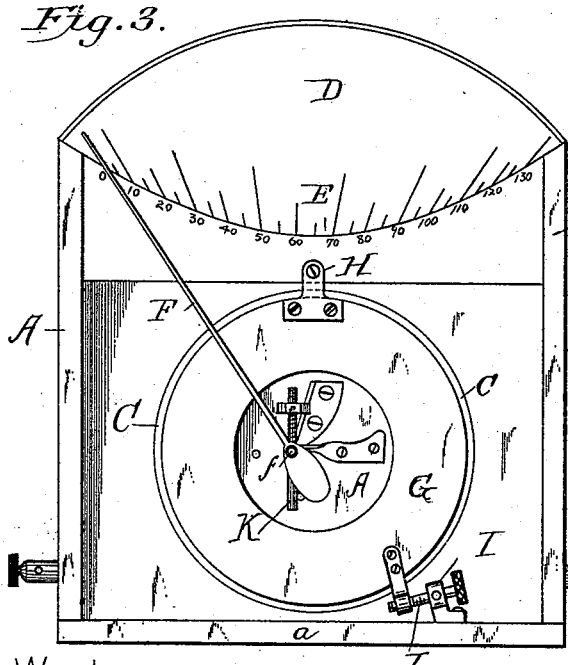
WITNESSES.
E. C. Smith
Minnie P. Bihler
INVENTOR.
Arakelyan H. Armen
by A. H. Bennett
ATT'Y

UNITED STATES PATENT OFFICE.

ARAKELYAN H. ARMEN, OF LYNN, ASSIGNOR TO DUNCAN GILLIS AND THOMAS W. GLEASON, OF BOSTON, MASSACHUSETTS.

VOLTMETER.

SPECIFICATION forming part of Letters Patent No. 496,678, dated May 2, 1893.

Application filed September 8, 1892. Serial No. 445,337. (No model.)

*To all whom it may concern:*

Be it known that I, ARAKELYAN H. ARMEN, of Lynn, in the county of Essex and State of Massachusetts, have invented certain new and useful Improvements in Voltmeters, of which the following, taken in connection with the accompanying drawings, is a specification.

The object of my invention is to provide an improved volt meter for measuring the electro-motive force of electric currents, and to so arrange the graduated index or gage of such instrument as that equal linear spaces thereon shall indicate an equal number of volts as the oscillating hand or pointer traverses the face of the gage.

The novel feature of my instrument is the dial or face thereof having, in distinction from the ordinary graduation in the arc of a circle, a graduated index or gage line subdivided into equal spaces and formed in a descending geometrical curve, drooping centrally toward the axis of the pointer and being in line other than the arc of a circle.

The shape of my instrument, as represented in the drawings is also novel and advantageous, having a flat bottom and back, so that it may stand firmly on any level surface or hang against a vertical wall, and having a horizontal projecting platform or base extending to the front.

In the drawings, Figures 1 and 2 are front and side elevations of my instrument. Fig. 3 is a front view with the front plate removed, showing the interior apparatus. Fig. 4 is a vertical central section thereof.

The case A of my instrument has a flat bottom with a base or foot $a$ projecting to the front, and a flat vertical back as seen in Figs. 2 and 4 so that it will stand steadily on a level surface or fit firmly against a wall. The front plate B is made removable, to give access to the armature K, the coil C and other interior parts, as in Figs. 3 and 4. The upper portion $b$ of this plate, seen in Fig. 1, is shown as distinct from the lower portion, leaving an open space between them showing a part of the dial D and the graduated index peculiar to my invention formed thereon.

The index or gage line E which characterizes my instrument, is formed in a descending geometrical curve, as a parabola or hyperbola, and being a line other than the arc of a circle drooping toward the axis $f$ of the pointer F, which axis is out of center of the coil as is usual in such instruments. This parabolic curved line E is graduated in equal subdivisions, and the hand or pointer F traverses the face of the dial as it is actuated by the current through the coil C.

The spool G carrying the coil, may be adjusted in relation to the armature and pointer by any suitable means which will serve to hold it in a fixed position when once properly calibrated.

Fig. 3 represents the spool as pivoted at H and made movable laterally to a limited extent by a screw J through a projection I on the case A.

In the use of my instrument the armature moving with the pointer F comes gradually nearer to the coil and the attraction varies with the square of the distance in accordance with the well known law. The pointer traverses unequal distances when the gage is in ascending arc of a circle, but with my descending index line it moves over equal spaces, by equal increments of electricity.

I claim as my invention—

1. In a volt meter the hand or pointer F actuated by the electric current, in combination with a dial having an index or gage line formed thereon in a centrally-drooping geometrical curve as described, such curved line being graduated in equal subdivisions, substantially as set forth.

2. In a volt meter, the case A, having a flat back and bottom and the face plate B partially covering the front thereof, in combination with the armature and eccentrically-mounted pointer and with the drooping parabolic index or gage, substantially as set forth.

In testimony whereof I have signed my name to this specification, in the presence of two subscribing witnesses, on this 12th day of August, A. D. 1892.

ARAKELYAN H. ARMEN.

Witnesses:
A. H. SPENCER,
CHARLES G. KEYES.